Nov. 25, 1930.  C. S. WRIGHT  1,782,863
PITMAN
Filed Nov. 8, 1926  2 Sheets-Sheet 2
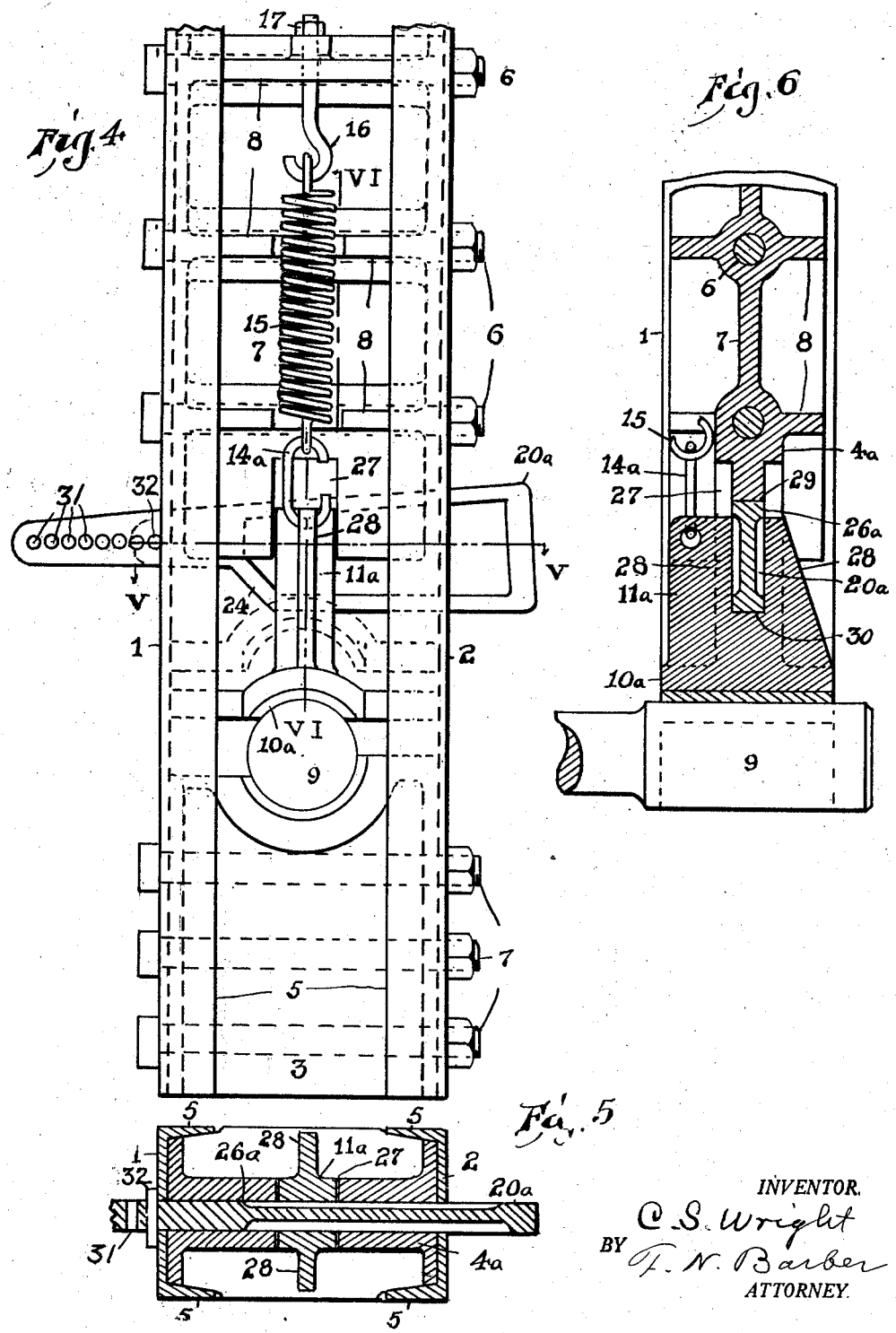
INVENTOR.
C. S. Wright
BY F. N. Barber
ATTORNEY.

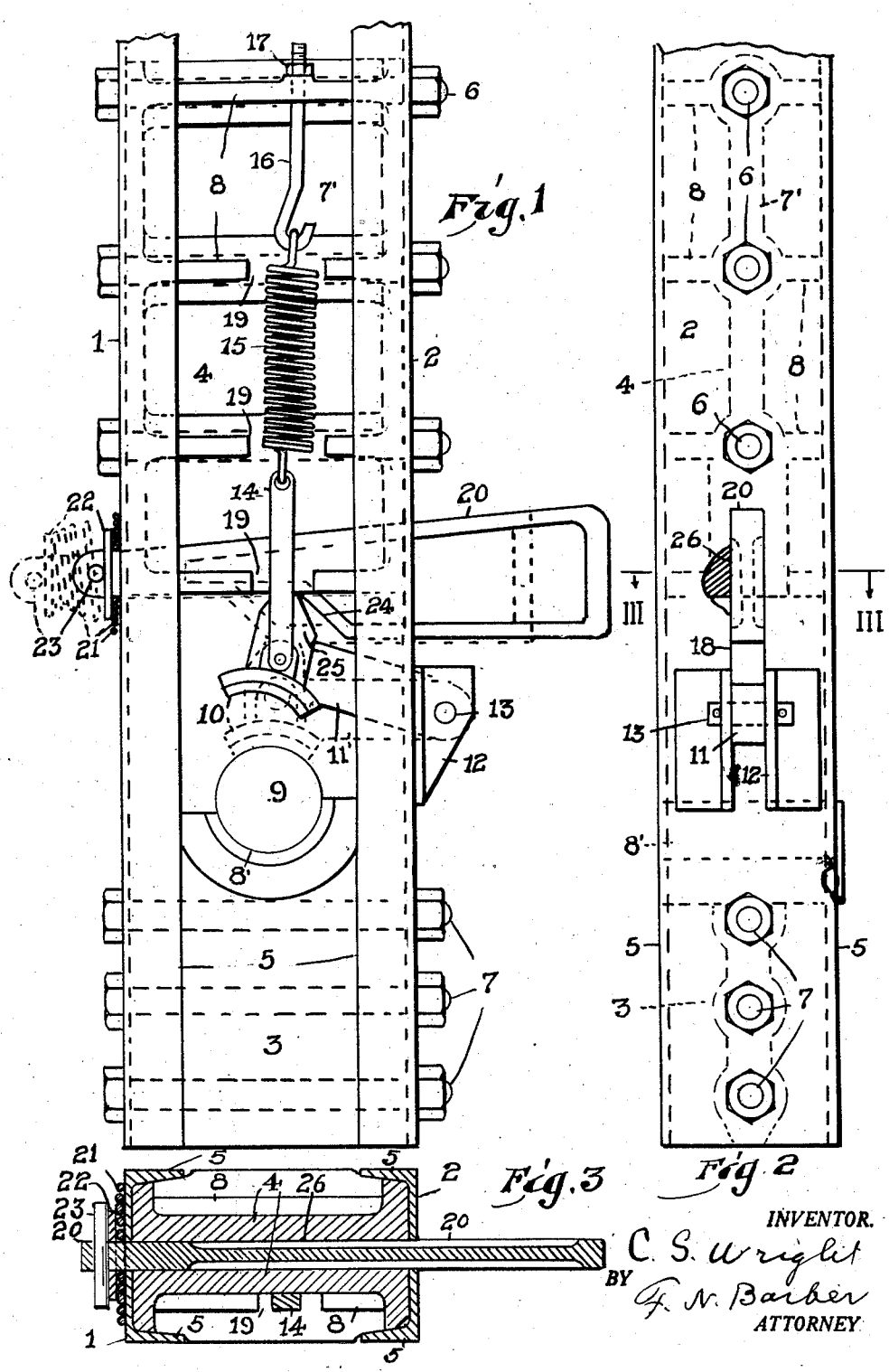

Patented Nov. 25, 1930

1,782,863

UNITED STATES PATENT OFFICE

CLYDE S. WRIGHT, OF TOLEDO, OHIO, ASSIGNOR TO THE NATIONAL SUPPLY COMPANY, OF TOLEDO, OHIO, A CORPORATION OF OHIO

PITMAN

Application filed November 8, 1926. Serial No. 146,980.

My invention relates to pitmen adapted for general use, but particularly designed for use in well-drilling apparatus as a connection between one end of the walking beam and the band-wheel crank-shaft.

One object of this invention is to provide for the lower ends of pitman bearings which will stand the large thrusts imposed upon them. Another object is to provide means for automatically removing the top member of a pitman bearing and holding it suspended above the wrist pin as soon as the locking key for the said member has been moved out of locking position, whereby the pitman may be readily removed from its bearing. Other objects relate to details which will be better understood after they have been described.

Referring to the accompanying drawings, Fig. 1 is a side view of the lower end of a pitman provided with my improvement, the wrist-pin being shown therein in end elevation; Fig. 2, an elevation, the view being taken from the right hand side of Fig. 1; Fig. 3, a section on the line III—III on Fig. 2; Fig. 4, a view like Fig. 1, but showing a modification thereof; Fig. 5, a section on the line V—V on Fig. 4; and Fig. 6, a section on the line VI—VI on Fig. 4, the wrist-pin being shown in side elevation and broken off.

On Figs. 1, 2 and 3 of the drawings, 1 and 2 designate two metal channel members or U-bars spaced apart to form the longitudinal sides or edges of a pitman. The backs of the channel members face outwardly, and the hollows are opposed or face each other. The channel members are spaced apart by the metal blocks or spacers 3 and 4 seated between the flanges or side members 5 of the channel members and secured to the channel members by bolts 6 and 7 extending through both the channel members and the intervening blocks. The block 4 comprises a vertical member 7' running centrally and longitudinally of the pitman and embracing the intermediate portions of the said bolts 6. From the member 7' horizontal ribs 8 extend laterally in both directions, the ribs being preferably opposite the bolts 6.

The upper or inner end of the block 3 is provided with a nearly semicylindrical upwardly-open recess or bearing 8' to receive the lower side of the wrist-pin 9. The upper bearing member 10 for the wrist-pin is provided with the arm 11 pivoted between the ears or lugs 12 secured to the outer face of the channel member 2, the arm 11 being carried by the pivot or pin 13 in the said ears and extending through a slot 18 in the member 2. To the top of the bearing member 10 one end of the link 14 is pivotally connected, the other end of the link being attached to the coiled spring 15 which has its upper end connected to a rod 16 passed through one of the upper ribs 8 and provided with a nut 17 resting on the top of the said rib. The ribs 8 below the top rib 8 and on one side of the member 7' are discontinuous at the points 19 to accommodate the said link and spring. When the member 10 is free to move the spring 15 lifts it free from the wrist pin 9 and holds it suspended as shown in Fig. 1.

20 is a wedge lying above the bearing member 10 and slidable in the upper end of the slot 18 in the member 2 and in a slot in the member 1, beyond which it extends. The end of the wedge beyond the member 1 is surrounded by the coiled conical spring 21, seated between the channel member 1 and the washer 22 held from escaping by the cross-pin 23. The lower edge of the wedge has the steep cam or incline 24 arranged to engage the lug 25 on the top of the bearing member 10 and force the latter to its proper contact with the wrist pin 9 when the wedge is driven to the left. When the member 10 is properly seated the lug 25 should rest against the lower face of the wedge at the right of the incline 24, as shown in dotted lines in Fig. 1. The lug 25 rests on the wedge at the left of the said incline when the bearing member 10 is lifted, as shown in full lines in Fig. 1. The spring 21 exerts a pressure tending to pull the wedge further to the left, whereby it acts as a locking means to prevent the wedge from moving so as to release the member 10.

The wedge 20 lies in a slot 26 in the lower end of the member 7' of the block 4, the top and side walls of the slot assisting to guide and sustain the thrust of the wedge.

The wrist pin 9 exerts at times large thrusts against the bearing member 10, these thrusts being so great that the key 20 might be forced toward the right out of its locking position, shown in Fig. 4, unless the inclination of the key where it contacts with the lug 25 is very small. It is desirable that the movable member 10 shall move upwardly for quite a distance away from the wrist pin as shown in Fig. 1 in order that the connection between the wrist pin and the pitman may be easily made. In order to provide the necessary space between the bearing members for the wrist pin, the steep incline 24 has been provided. As the incline 24 is too steep to serve by its contact with the lug 25 as a lock for holding the movable bearing against the wrist pin, the comparatively slight incline at the right hand end of the incline 24 has been provided so that when the key 20 is driven to the left to its normal locking position the said slight incline will rest upon the top of the lug 25. This incline is so slight that any pressure which the wrist pin can exert upwardly is not sufficient to move the key to the right or out of the said locking position.

In Figs. 4, 5 and 6, the structure is substantially as in Figs. 1, 2 and 3 except as to the means for guiding and supporting the upper bearing member 10$^a$ and some of the details of the wedge 20$^a$ and the parts adjacent thereto. Parts which are the same as those on Figs. 1, 2, and 3 bear the same reference numerals while parts analogous to those on Figs. 1, 2 and 3 bear the same reference numerals followed by the letter "a".

The bearing member 10$^a$ has the upright stem 11$^a$ which is connected to the lower end of the spring 15 by the C-shaped link 14$^a$, the bearing 10$^a$ being guided up and down by the interior surfaces of the channel members 1 and 2, as shown in Fig. 4. The wedge slides in the slot 26$^a$ in the block 4$^a$. The stem 11$^a$ is slotted, its members 28 being slidable in slots 27 in the block 4$^a$. The wedge 20$^a$ works between the top wall 29 of the slot 26$^a$ and the bottom wall 30 at the bottom of the slot between the members 28 of the stem 11$^a$. The wedge is shown with the holes 31 into which a cross-pin 32 may be inserted close to the member 1 to prevent the movement of the wedge to the right and the release of the bearing member 10$^a$.

I claim—

In a metallic pitman, a pair of individual channel bars extending longitudinally of the pitman, a block distinct from the bars and seated in the channels of both bars, a wrist-pin bearing member carried by the block, a second block seated in the said channels of the bars and spaced from the first block, means for clamping the blocks to the bars, a bearing movable in the said space for engaging a wrist-pin opposite the portion thereof engageable by the first bearing member, and means cooperating with the second block and the movable bearing for holding the movable bearing in operative position.

In testimony whereof I affix my signature.

CLYDE S. WRIGHT.